(12) United States Patent
Bassovitch

(10) Patent No.: US 9,576,496 B2
(45) Date of Patent: Feb. 21, 2017

(54) FLIGHT TRAINING SYSTEM

(71) Applicant: BIOMEDTECH AUSTRALIA PTY LTD, Moorabbin, Vic (AU)

(72) Inventor: Oleg Bassovitch, Highett (AU)

(73) Assignee: BIOMEDTECH AUSTRALIA PTY LTD, Moorabbin, Victoria (AU)

( * ) Notice: Subject to any disclaimer, the term of this patent is extended or adjusted under 35 U.S.C. 154(b) by 143 days.

(21) Appl. No.: 14/359,270

(22) PCT Filed: Nov. 12, 2012

(86) PCT No.: PCT/AU2012/001381
§ 371 (c)(1),
(2) Date: May 19, 2014

(87) PCT Pub. No.: WO2013/071342
PCT Pub. Date: May 23, 2013

(65) Prior Publication Data
US 2014/0322675 A1    Oct. 30, 2014

Related U.S. Application Data

(60) Provisional application No. 61/561,001, filed on Nov. 17, 2001.

(51) Int. Cl.
G09B 9/10 (2006.01)
G09B 9/08 (2006.01)

(52) U.S. Cl.
CPC ............... *G09B 9/10* (2013.01); *G09B 9/085* (2013.01)

(58) Field of Classification Search
CPC ............. G09B 9/003; G09B 9/02; G09B 9/04; G09B 9/06; G09B 9/08; G09B 9/085; G09B 9/10
See application file for complete search history.

(56) References Cited

U.S. PATENT DOCUMENTS

| | | | | |
|---|---|---|---|---|
| 2003/0060942 A1* | 3/2003 | Kotzev | .................. | G01C 23/00 701/3 |
| 2003/0219702 A1* | 11/2003 | McClintic | ................ | G09B 9/20 434/45 |
| 2005/0202374 A1 | 9/2005 | Stepanek et al. | | |

OTHER PUBLICATIONS

International Search Report dated Dec. 11, 2012 for corresponding International Patent Application No. PCT/AU2012/001381 filed Nov. 12, 2012.
Written Opinion of the International Searching Authority dated Dec. 11, 2012 for the corresponding International Application PCT/AU2012/001381 filed Nov. 12, 2012.
(Continued)

*Primary Examiner* — Timothy A Musselman
(74) *Attorney, Agent, or Firm* — David D. Brush; Westman Champlin & Koehler, P.A.

(57) ABSTRACT

The present invention provides a system for training a subject to recognize the onset of hypoxia, the system including (i) a flight simulation system, and (ii) a hypoxia induction system, wherein the flight simulation system is operably linked to the hypoxia induction system. The system provides a tool for pilot training to a pilot, allowing for the delivery of standardized training programs where the tasks required for the operation of an aircraft are able to be coordinated with an induction of hypoxia in the subject. Such a system is also able to provide an assessment tool to demonstrate when a pilot has had sufficient training in recognizing the effects of hypoxia.

6 Claims, 1 Drawing Sheet

(56) References Cited

OTHER PUBLICATIONS

Temme et al.: "Hypoxia and Flight Performance of Military Instructor Pilots in a Flight Simulator," Aviation, Space and Environmental Medicine, vol. 81, No. 7, Jul. 2010.

Artino et al.: "Mask-On Hypoxia Training for Tactical Jet Aviators: Evaluation of an Alternate Instructional Paradigm", Aviation,Space and Environmental Medicine, vol. 77, No. 8, Aug. 2006.

Folga, R.: "Simulation Enhanced Hypoxia Training" Naval Survival Training Institute, Department of Defense, Human Factors Engineering, Technical Advisory Group (TAG) Meeting 59, May 5-8, 2008, Destin, Florida. Retrieved from the Internet <http://www.hfetag.com/subtags/briefs/docs-59/59-model-folga.pps>.

Henderson, B.: "Exposure to Mild Hypoxia and Implications for Decision Making", retrieved Nov. 26, 2012. Retrieved from the Internet, <URL: http://www.danlj.org/~danlj/Soaring/Oxygen/TechSoaring 2005/Henderson_low_alt_hypoxia_Ostiv.pdf> published Oct. 2001 as from per front page of Document.

\* cited by examiner

FLIGHT TRAINING SYSTEM

CROSS REFERENCE TO RELATED APPLICATIONS

The present application is based on and claims the benefit of U.S. provisional patent application Ser. No. 61/561,001, filed Nov. 17, 2011, the content of which is hereby incorporated by reference in its entirety.

The present application is a Section 371 National Stage Application of International Application No. PCT/AU2012/001381, filed Nov. 12, 2012, which is incorporated by reference in its entirety and published as WO 2013/071342 on May 23, 2013, in English.

The present invention relates to the training of aircrew, and particularly aircraft pilots. In particular, the invention relates to systems, methods and devices useful in training pilots to recognise hypoxia and the effects thereof.

BACKGROUND

The safe operation of aircraft is heavily dependent on the experience and skill of the pilot. However, even for a highly experienced pilot, aviation can be a dangerous activity for crew and passengers alike.

A particularly perilous scenario occurs upon depressurization of the cabin at altitudes where the partial pressure of oxygen is not sufficiently high so as to provide the pilot with sufficient oxygen for normal functioning. In particular, a slow depressurization may not be noticed by the pilot, and hypoxia can set in insidiously. Early recognition of hypoxia is critical in preventing incapacitation to enable corrective actions to be taken. Sudden explosive decompression is self-evident but hypoxic symptoms from slow or unrecognised depressurisation are often subtle and may be difficult to recognise without previous training. Depending upon the altitude, there is often very limited time for aircrew to recognise any hypoxia symptoms before losing consciousness.

Hypoxia is a condition of reduced oxygen bio-availability caused by decreased oxygen diffusion from the lungs to blood, impaired oxygen transport in blood, decreased tissue perfusion or chemical toxicity in cells. At altitude decreasing barometric pressure leads to a decreasing partial pressure of oxygen in the air, which reduces the force driving oxygen from the lungs into the bloodstream. Hypoxia triggers various cardiovascular and respiratory adjustments in the body, but despite such compensations it causes impaired function in vision, cognition, motor control, and ultimately severe incapacitation, unconsciousness and ultimately death. At altitudes exceeding 20,000 feet consciousness can be lost rapidly, and this has been called the hypoxia "Critical Zone".

The dangers of hypoxia in aviation have been clearly demonstrated numerous times, with one example being the crash of the Helios Airways Boeing 737-300 into a mountain on 14 Aug. 2005, killing all 121 passengers and crew. An investigation implicated pilot hypoxia due to failure of the cabin to pressurize at takeoff. Another accident caused by decompression resulting in pilot hypoxia was the loss of a Learjet in 1999 over South Dakota, and that of a Beechcraft 200 Super Air King which impacted near Mt Isa, in Queensland Australia.

In November 2010, United States Air Force F-22 Raptor crashed in Alaska, killing the pilot. Investigations showed the cause to be related to oxygen deprivation of the pilot. In 2011 the Air Force grounded its entire F-22 fleet for four months due to problems with the aircraft's oxygen generating system. Further problems were noted in 2012, with pilots being forced to land after experiencing symptoms of oxygen deprivation. In total, oxygen deprivation has been reported in at least 12 separate incidents across the 187 strong F-22 fleet since its 2005 launch.

A recent Australian Transport Safety Bureau report on hypoxia and loss of cabin pressure describes 517 incidents in Australia between 1975 and 2006. Indeed, the risk of hypoxia in civilian aircraft may be increasing as the performance and flight envelope of civil registered aircraft expands.

Oxygen warning systems on aircraft may not provide adequate protection and can malfunction or be missed or ignored. The effects of gradually developing hypoxia are subtle and can occur insidiously. At 25,000 feet aviators have three-five minutes to recognise hypoxia and act and rescue themselves.

A number of training programs are offered in the aviation industry in an effort to assist pilots in detecting the first signs of hypoxia. Early recognition is important because the pilot is able to take advantage of a breathing apparatus and prevent any further decrease in cognition. However, many of these training programs are deficient, as evident from the numbers of hypoxia related incidents which are still seen in aviation.

It is an aspect of the present invention to overcome or alleviate a problem of the prior art by providing improved systems, methods and devices for hypoxic flight training.

SUMMARY OF THE INVENTION

In a first aspect the present invention provides a system for training a subject under conditions of hypoxia, the system including (i) a flight simulation system, and (ii) a hypoxia induction system, wherein the flight simulation system is operably linked to the hypoxia induction system. In one embodiment of the system, human input is not permitted or required in the operable linkage.

In certain embodiments one or both of the flight simulation system and the hypoxia induction system are operated according to a predetermined program.

In some embodiments the flight simulation system controls the hypoxia induction system, and the flight simulation system may selectively controls the hypoxia induction system at a predetermined point in the flight plan. Preferably, the flight simulation system selectively controls the hypoxia induction system at a time in the flight plan requiring considerable attention to aircraft operation by the subject.

The system may further comprise means for physiological and/or cognitive assessment of the subject. Further embodiments of the system provides for means for reporting the physiological and/or cognitive assessment of the subject.

In another embodiment, the system comprises means to automatically cease hypoxic conditions upon attainment of a predetermined physiological condition of the subject.

The system may be adapted or configured to be capable of operable linkage with a hypoxia induction system and/or a flight simulation system.

In a second aspect there is provided a method for training a subject under conditions of hypoxia, the method including the steps of (i) providing a system as described herein, and (ii) executing a training program.

DETAILED DESCRIPTION OF THE INVENTION

It is proposed that the prior art methods for training pilots to recognise hypoxia are deficient because they fail to incorporate conditions which approximate those experienced in real world flight. For example, many courses are classroom based, relying on audiovisual materials, printed materials and the like to instruct a subject in the physiological and associated cognitive changes that take place under hypoxic conditions. Classroom desktop hypoxia training is useful for the purpose of education of aircrew on individual hypoxia symptoms, providing solid theoretical and practical knowledge of altitude physiology. These programs often involve debriefing of students and discussing their individual perceptions. While such programs are helpful, a pilot is not trained to recognise hypoxia under real flying conditions. Even where a classroom-based training program includes the actual induction of hypoxia in a student subject by inhalation of oxygen depleted air, the student may still not be able to recognise early stage hypoxia.

The present invention is predicated at least partially on the finding that hypoxia (and particularly the early stages of hypoxia) is difficult to recognise where the pilot's attention is directed to one or more of the many tasks associated with operating an aircraft such as maintaining radio communication, navigation, heading adjustment, altitude adjustment, surveying instruments, surveying landmarks, monitoring the position of other aircraft in the area etc. These tasks can detract from the pilot noticing the effects of early hypoxia, potentially leading to a catastrophic outcome as exemplified in the Background section herein.

Prior art methods train pilots under conditions where their attention is directed completely (or almost completely) to the subject of hypoxia recognition. Thus, the student is heavily focused on self-monitoring cognitive abilities, breathing, vision, heart rate etc. in an effort to identify the early effects of hypoxia.

The present inventor has recognised that a pilot actually operating an aircraft will rarely be in a position to engage in such self-monitoring. Indeed such self-monitoring may be contraindicated because it detracts from the pilot's primary role of operating the aircraft. Under real world flying conditions the self-detection of hypoxia is more difficult, and may occur too late and when the pilot is suffering significant cognitive impairment and not able to use a breathing apparatus. Thus, improved hypoxia training is provided under conditions simulating the actual operation of an aircraft. Under these conditions, the pilot is trained to recognise hypoxia whilst he or she is engaged in one or more tasks that are required in aircraft operation.

Training under real world conditions educates the pilot to recognise the symptoms of hypoxia in the context of normal aircraft operation. The symptoms recognised may vary according to the individual, but it may be the subtle effects on the actual ability to perform tasks associated with operating an aircraft, as distinct from the effects noted by self-monitoring in a classroom situation (such as the changes in cognitive ability as noted by standard tests of cognition such as assessment of simple and choice reaction times, simple maths processing, spatial orientation, memory, shape discrimination and colour vision (BK, Ishihara or similar plates), changes in respiration, and the like).

In some embodiments the present invention allows for a pilot to identify the early effects of hypoxia by learning the effects on actual flying ability.

Apart from the above, the pilot is trained to recognise hypoxia when in a distracted state. This is a significant departure from prior art training methods that train under conditions whereby the pilot is heavily concentrating on identifying the effects of hypoxia.

In accordance with the above, the present invention provides a system for training a subject to recognise the onset of hypoxia, the system including (i) a flight simulation system, and (ii) a hypoxia induction system, wherein the flight simulation system is operably linked to the hypoxia induction system. A system whereby flight simulation and hypoxia induction systems are capable of interacting provides a tool capable of delivering improved training to a pilot. The operable linkage of the two systems allows for the delivery of standardised training programs where the tasks required for the operation of an aircraft are able to be coordinated with an induction of hypoxia in the subject. Such a system is also able to provide an assessment tool to demonstrate when a pilot has had sufficient training in recognising the effects of hypoxia.

Flight simulation systems are known in the art of pilot training, with the present methods being potentially operable with any presently known or future simulation systems. By way of example only, the present invention is operable with the following flight simulation systems:

1. Cockpit Procedures Trainer (CPT), as used to practice basic cockpit procedures, such as emergency checklists, and for cockpit familiarization. Certain aircraft systems may or may not be simulated. The aerodynamic model is usually extremely generic if one is even present at all.

2. Aviation Training Device (ATD), as used for basic training of flight concepts and procedures. A generic flight model representing a "family" of aircraft is installed, and many common flight systems are simulated.

3. Basic Instrument Training Device (BITD), which is a basic training device primarily focused on generic instrument flight procedures.

4. Flight and Navigation Procedures Trainer (FNPT), as used for generic flight training. A generic, but comprehensive flight model is often present, and many systems and environmental effects are provided.

5. Flight Training Device (FTD), as used for either generic or aircraft specific flight training. Comprehensive flight, systems, and environmental models are often present. High level FTDs require visual systems but not the characteristics of a Full Flight Simulator (FFS).

6. Full flight simulator (FFS), as used for aircraft-specific flight training under rules of the appropriate National Civil Aviation Regulatory Authority. Under these rules, relevant aircraft systems are fully simulated, and a comprehensive aerodynamic models are often present. FFS systems require outside-world (OTW) visual systems and a motion platform.

7. Full Mission Simulator (FMS), as used by the military to denote a simulator capable of training all aspects of an operational mission in the aircraft concerned.

The flight simulation system as required by the present invention is preferably electronically controlled, and more preferably computer-controlled thereby facilitating operable interaction with the hypoxia induction system. The flight simulation system may be based on any of the consumer-level software titles such as any of the Flight Simulator series (Microsoft Corporation), or FlightGear (open source, www.flightgear.org), as executed on a personal computer having a storage means, processing means, input means and visual output means.

Computer controlled flight simulation systems are typically written in a well known programming language such as C or C++. Accordingly, given the code the skilled person is capable of amending existing code and/or providing newly created code capable of sending and/or receiving signals and/or information to the hypoxia induction system at certain times during the simulated flight. Some codes are publically available (such as FlightGear, which is open source). Other codes are proprietary, with details of the code known only to the developers. In such case, use of a software development kit (SDK) can be useful where the full code is not available. To that end, Microsoft Corporation provide a SDK for many versions of the Flight Simulator series, including Flight Simulator X.

Exemplary programming code is shown in Example 2 herein.

Microsoft Corporation provides the skilled person with other resources to assist in the development of "add-ons" for their Flight Simulator products. For example, an ESP Development Center is provided by Microsoft Corporation under the Microsoft Developer Network (MSDN).

Microsoft Flight Simulator is designed as a platform allowing customization, with many third party developers providing customized versions and add-ons. Third-party development is made possible by the "extensibility" of Flight Simulator. There are two main ways this is achieved: data extensibility, and code extensibility. Of more relevance to the present invention is code extensibility which provides for significant flexibility. A prerequisite to utilizing Code Extensibility is a working understanding of C, C++ or C#, which are all languages well understood by the skilled person.

The skilled person will be most easily enabled to effect the operable linkage required by the present invention where the complete code of the flight simulation software is provided. As mentioned supra, FlightGear is an open source software written in the C++ and C languages. The complete code is available on optical media (as obtained from www.flightgear.org/dvd) or by download (www.flightgear.org/Downloads/binary).

The hypoxia induction system may be any system comprising hardware and/or software components capable of inducing a state of hypoxia in a subject to an extent necessary for the prior training of hypoxia recognition. The system is preferably electronically controlled, and more preferably computer-controlled thereby facilitating operable interaction with the flight simulation system. Such systems are often known in the art as "hypoxicators".

Typically, hypoxia induction systems comprise a mask or other physical means to localise an altered gas stream about the mouth and nose, the gas being depleted in oxygen. The hypoxia induction system may be largely self contained, relying on the subject rebreathing expired air to induce hypoxia. In embodiment control of hypoxia may be achieved by manipulation of an electronically controlled valve that either (i) directs expired air either back the subject (to increase hypoxia), or (ii) exhausts air to the environment (to decrease hypoxia).

Alternatively, the hypoxia induction system may rely on the selective mixture of gases to provide an oxygen depleted gas stream to induce a hypoxic state in the subject. For example, streams of oxygen and nitrogen gas derived from separate gas bottles may be mixed in varying proportions by one of more electronically operated valves to achieve a desired percentage of oxygen. Exemplary systems have been previously described: Pedlar C R, Howatson G, Whyte G P, Godfrey R J, Macutkiewicz D. Simulating moderate altitude using normobaric hypoxia with commercially available hypoxic gas generators. High Alt Med Biol. 2005 Winter; 6(4):346-7; and also Artino A R, Folga R V, Swan B D, Mask-On Hypoxia Training for Tactical Jet Aviators: Evaluation of an Alternate Instructional Paradigm, Aviation, Space, and Environmental Medicine Vol. 77, No. 8 August 2006.

The hypoxia induction system may rely on gas filtering technology to alter the concentration of oxygen in air. One example is by a semipermeable membrane that separates oxygen from nitrogen. Exemplary systems utilise semipermeable hollow fibre air separation methodologies.

Preferably the hypoxia induction system is computer controlled, thereby facilitating operable linkage to the flight simulation system. A number of computer controlled hypoxia systems are known in the art including those manufactured by Biomedtech Australia Pty Ltd. For example, the GO2Altitude hypoxic and hyperoxic air generator may be used in conjunction with the GO2Altitude hypoxicator station to provide accurately controlled levels of oxygen. The hypoxicator station is equipped with an interface allowing connection to a PC.

Miniature, on-demand, normobaric hypoxiators such as the GO2Altitude device are compatible with many, if not all military masks currently in service.

In the context of the present invention, normobaric hypoxia eliminates the risk of hypobaria. Normobaric means also allow for the pilot to keep his mask in place (thereby providing for increased simulation realism. Overall, the pilot's perception is closer to that experienced in a real flying situation.

Preferably, the hypoxia induction system is devoid of a gas bottle (or similar reservoir). Gas bottles are bulky, and are contraindicated where space is an issue. For example, systems devoid of a gas bottle are proposed to be applicable to applications such as contrifuge-based simulators, fully details of which are provided infra.

The above systems are normobaric (meaning that they are operable at atmospheric pressure), and highly preferred in the context of the present invention for reasons of simplicity and economy. However it will be understood that the present systems for training may in some embodiments extend to hypobaric chambers to induce a hypoxic state in a subject. Many hypobaric chambers are electrically or computer controlled, and therefore amenable to operable linkage with a flight simulation system.

While operable, embodiments reliant on a chamber present some problems. In a chamber, hypoxia is induced by removing the oxygen mask. With normobaric systems the same mask can be used for both hypoxia and oxygen supply thereby improving the fidelity of simulation. Furthermore, some computer equipment malfunctions at altitudes above about 20,000 feet.

The hypoxia induction system may comprise oxygen sensing means to qualitate or quantitate the degree of hypoxia in the subject. A convenient and non-invasive hypoxia sensing means is a pulse oximeter device which indirectly monitors the oxygen saturation of the subject's blood and changes in blood volume in the skin. Suitable pulse oximeters for use in the present systems are manufactured by companies such as Nonin Medical Inc (Minnesota, USA). Inclusion of an oxygen sensing means may allow for the establishment of a feedback loop such that the system is capable of modulating the concentration of oxygen in the gas stream breathed by the subject in order to achieve a predetermined level of oxygen saturation.

The oxygen sensing means may also allow for the provision of an automatic safety cut-off mechanism as, as more fully described infra.

According to the present invention the flight simulator system and hypoxia induction system are operably linked. As used herein the term "operably linked" is intended to mean that the two systems are capable of sending and/or receiving a signal or more complex information between each other. The signal or information may be sent in a one way direction (from the flight simulation system to the hypoxia induction system, or vice versa), or in both directions with either or both systems sending and receiving the signal or information. The signal may be a simple electrical signal (such as: on, off, a certain resistance, a certain current, or a certain voltage). The information may be simple information (such as: yes, no, stop, go), or a more complex instruction (such as: decrease oxygen saturation to 85%, or bank left to a heading of 265 degrees).

The operable linkage may take the form of any arrangement capable of achieving the function of communication between the two systems. The linkage may be electric or electronic and may be a simple connection between the flight simulation and hypoxia induction systems. Where more complex information is shared between the two systems the operable linkage may be a standard serial or parallel computer interface, or a universal serial bus (USB) interface. The skilled person will appreciate that the signal or information may be communicated via means, such as the 802.11 wireless protocol.

In one embodiment, the operable linkage is at least partially reliant on a communication protocol, the protocol configured to allow instructions to be transmitted from the flight simulator system to the hypoxia induction system. Thus under predetermined conditions of flight simulation, the simulator system may transmit a protocol instruction to the hypoxia induction system for the purpose of inducing hypoxia in the pilot.

An advantage of this embodiment is that comprehensive software integration between the two systems is not required. Instead, a protocol is implemented such that the hypoxia induction system is capable of altering the level of oxygen to the user in a manner consistent with the instruction provided by the flight simulation system.

A further advantage of a protocol-based operable linkage is that there is no requirement for any detail on the operation of the flight simulation system to be disclosed to a developer of the hypoxia induction system, or indeed any other third party. Flight simulation systems may include proprietary information which the developer does not wish to divulge. In some circumstances, the flight simulation system includes military information which the government concerned must keep secret. In these circumstances the protocol may operate in a strict one way manner, with protocol instructions being transmitted from the flight simulation system to the hypoxia induction system but not vice versa.

The protocol instructions may be directed to setting or altering any parameter of the hypoxia induction system such as the percentage of oxygen in the gas mixture dispensed to the simulator pilot, the duration of dispensation of a hypoxic gas mixture to the pilot, the rate of change of the percentage of oxygen in the gas mixture, emergency cut off of the hypoxia induction system and the like.

The protocol instructions may direct monitoring of vital signs and direction cessation of hypoxia training mission if a preset safety physiological parameters hits a predetermined threshold, supply oxygen for recovery, make audio and/or video recording of the pilot performing the training session, receive, analyze and present statistics of time to respond to certain task, number of errors while completing the task, delay in responding to the task, receive and store personal details such as trainee Name and Date of Birth, print session report with statistics and graphs showing trend lines of reaction time, number of errors, delay in responding to the task, graph of the altitude profile vs vital signs SpO2 and Heart Rate.

Details of the protocol may be agreed upon during development of both flight simulation and hypoxia induction systems. Alternatively, the software of one system may be specifically configured to utilize a pre-existing protocol of the other system. To that extent, it will be understood that the term "protocol" as used herein is not necessarily restricted to an agreed set of rules for the transmission or interchange of information between two systems. The term "protocol" also includes a set of rules constructed by a first party for use with a first system, to which a second party can adapt and use with a second system.

An exemplary protocol is described in Example 4 herein.

In some embodiments, it may be necessary for a two way protocol to be implemented. For example, a two way protocol may be necessary where the flight simulation system requires feedback from the hypoxia induction system. As discussed elsewhere herein, the hypoxia induction system may comprise an oximeter in which case the partial pressure of oxygen in the simulation pilot's blood could alter the course of the simulated flight.

As an illustration of such an embodiment, the flight simulation system may not challenge the pilot's flying abilities until he is in a predetermined hypoxic state, as revealed by the oximeter reading of the hypoxia induction system.

The protocol instructions may be transmitted from a processor of the flight simulation system to a processor of the hypoxia induction system, and optionally vice-versa. Typically, the transmission and/or reception of protocol instructions are handled by the discrete software controlling the flight simulation system and the hypoxia induction system. In a preferred embodiment, an application programming interface (API) or application binary interface (ABI) is included to allow the two software components to communicate with each other.

Figure 1:
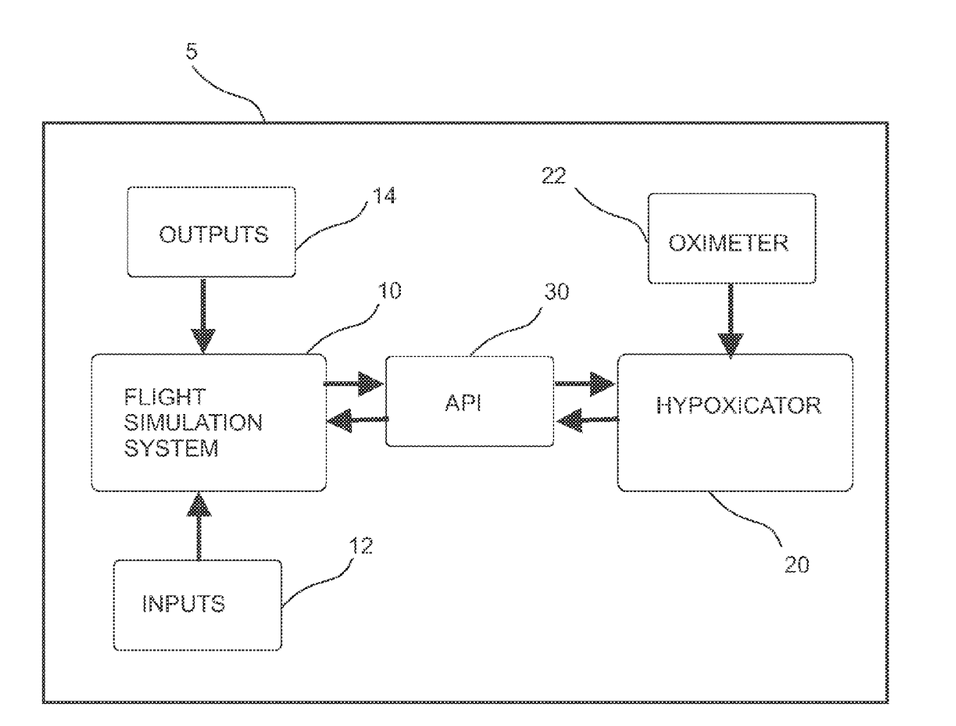

An exemplary system comprising an API is described in FIG. 1, and Example 3 herein.

In a further aspect, the present invention provides an application programming interface or application binary interface configured to allow a flight simulation system to communicate with a hypoxia induction system.

Where the flight simulation and hypoxia induction systems are under the control of a single processor, the operable linkage may be purely software-based. For example, the flight simulation system may be executed on a personal computer, where that same computer is used to control the hypoxia induction system. Thus, in a circumstance whereby the flight simulation system requires that the subject is placed in a hypoxic state, the flight simulation application sends a software-based instruction to the application controlling the hypoxia induction system to decrease the level of oxygen being provided to the subject.

Other means of operable linkage will be apparent to the skilled person requiring no more than routine experimentation for incorporation into a system of the present invention. All such means are included within the scope of the present systems.

In one embodiment of the system, the system for training a subject to recognise the onset of hypoxia is operable without any human involvement, and/or is automated. It is proposed that a further problem in the training of pilots is that of standardization and/or reproducibility and/or safety of the training program. The present systems are amenable to the execution of a predetermined training program whereby certain flight plan can be executed, and a certain level of hypoxia be induced at certain point in the flight plan. Thus, a plurality of subjects can be trained using a set training programme, with the results of each subject capable of direct comparison. Furthermore, a single subject can undertake a single training programme on multiple occasions and assess the level of improvement in identifying hypoxia over time.

In one embodiment, the system is configured such that human input is not permitted or required in the operable linkage.

Applicant further proposes that advantage is gained where a human operator is not involved given the possibility that bias is injected into a training method, especially where there is an assessment component. The operator may favour one subject over another, and provide the favoured subject with a less rigorous test programme. Bias may also be an issue where the system is used in a research context whereby an operator may consciously or unconsciously attempt to achieve a desired result to support an experimental hypothesis.

A further advantage of this embodiment is safety, given that operator error is removed. Training programs may be executed by persons not entirely familiar with the physiological effects on hypoxia and may induce a level that is too deep, or maintain a hypoxic state for a dangerous length of time. Even where the trainer is well versed in such issues, simple distraction or a lack of concentration could lead to serious injury or death of the subject where the trainer fails to adequately control the level of hypoxia.

The basic system for pilot training described supra may be supplemented with further features to enhance any of the advantages described herein, or even provide further advantages. For example, the system for pilot training may comprise means for measuring and/or recording the subject's physiological data including blood oxygen saturation, respiration, blood pressure, respiration, heart rate and the like. Such embodiments allow for the provision of a safety feature whereby the system reverts to administering more normal oxygen levels if the subject is in danger of succumbing adverse health effects of hypoxia. Thus, where the physiological data (such as heart rate, respiration rate, or oxygen saturation) crosses a predetermined threshold, the system commences the administration of a more normal gas mix in order to prevent any negative health effects on the subject that may be occasioned by continuation of hypoxia.

The system may comprise means for the cognitive assessment of the subject, and/or means for video recording the subject during a training session, and/or means for generating a training session report generation, and/or means for automated debriefing on the training session results;

For added realism, the present systems may comprise means for exerting an acceleration force on the simulation pilot. Exemplary means include the centrifugal contrivances manufactured by AMST—Systemtechnik GmbH (Austria), some of which are equipped with a flight simulator system. It is proposed that integrated systems capable of exposing a simulation pilot to both acceleration forces and hypoxia provide for significantly improved pilot training. Human physiology is complex, with the combined influences of hypoxia and g-forces being substantially unpredictable in terms of the perceived or real effect on a pilot's abilities. The tripartite systems disclosed herein provide means for exposing a simulation pilot to the combined effects of g-forces and hypoxia in a fully computer-controlled manner.

In a further aspect, the present invention provides a flight simulation software or system adapted or configured to be capable of operable linkage with a hypoxia induction system.

In a further aspect, the present invention provides a hypoxia induction system adapted or configured to be capable of operable linkage with a flight simulation system.

In a further aspect, the present invention provides a method for training a subject under conditions of hypoxia, the method including the steps of (i) providing a system as described herein, and (ii) executing a training program.

EXAMPLE 1

Training Session Incorporating System Comprising Microsoft Flight Simulator X Operably Linked to GO2Altitude Normobaric Hypoxicator The subject receives a standard briefing on the effects of simulated altitude, nature of hypoxia, and all measurements and monitoring to be taken. He is briefed on the potential hazards of simulated altitude exposure and hypoxia and conditions which would exclude him undertaking the actual hypoxia exposure.

The subject gives written informed consent after receiving verbal and written information on the study design, risks, and voluntary nature of participation.

Induction of hypoxia is achieved by a GO2Altitude® hypoxicator which simulates exposure to 25,000 ft limited to 5 minutes, with rapid recovery effected by breathing oxygen.

The subject is supervised at all times by a physician or MICA attendant, ACLS accredited. Subject has baseline measures in a normoxic normobaric environment, SpO2 by pulse oximetry, heart rate, respiratory frequency, heart rate variability are non-invasive physiological parameters recorded.

Microsoft flight simulator is operably linked to a GO2Altitude system. The Go2Altitude system is controlled by the same PC as that running the flight simulator software. The operable linkage is effected by the amendment of the standard code for flight simulator. The effect of the amendment is such that a flight plan can include an alteration to oxygen levels in the virtual cockpit at predetermined points in the flight plan.

The flight simulator is loaded with a flight plan involving take off, straight and level flight, complex direction and altitude adjustments, and landing. The flight simulator flight plan also includes instructions at predetermined points in the flight plan to induce hypoxia in the subject by way of the Go2Altitude system.

Flight simulator mission configuration is planned so as to provide the best chance of demonstration and remembering of insidious nature of hypoxia to the pilot trainee.

TABLE 1

Mission profile for Civil aviation pilot.

| Mission Time, mm:ss | Given Task | Physiologically simulate altitude, ft asl | |
|---|---|---|---|
| 00:00 | Preparation for a takeoff | 0 | |
| 02:15 | Takeoff | 0 | |
| 06:00 | Set Altitude 24,000 ft. Heading: XXXX | 500 | |
| 08:00 | Change altitude 26,000 ft | 500 | |
| 09:30 | Oil over temperature left engine. Perform checks, rectify problem, report. | 500 | |
| 15:00 | Due to turbulence change heading and altitude | 26,000 | Hypoxia episode |
| 16:00 | Due to turbulence change heading and altitude | 26,000 | Hypoxia episode |

TABLE 1-continued

Mission profile for Civil aviation pilot.

| Mission Time, mm:ss | Given Task | Physiologically simulate altitude, ft asl |
|---|---|---|
| 16:30 | Due to turbulence change heading and altitude | 26,000 Hypoxia episode |
| 17:15 | Due to turbulence change heading and altitude | 26,000 Hypoxia episode |
| 17:35 | Due to turbulence change heading and altitude | 26,000 Hypoxia episode |
| 18:15 | Due to turbulence change heading and altitude | 26,000 Hypoxia episode |
| 19:45 | Due to turbulence change heading and altitude | 26,000 Hypoxia episode |
| 20:30 | Pilot reports hypoxia recognised, takes rescue steps, immediate dive to 10,000 ft | 0 |
| 21:15 | Oxygen supply restored | 40% Oxygen supplied |
| 22:45 | Request to report situation, report symptoms | 0 |
| 25:00 | Continue flight mission . . . | 0 |

TABLE 2

Mission profile for Military pilot training.

| Mission Time, mm:ss | Given Task | Physiologically simulate altitude, ft asl |
|---|---|---|
| 00:00 | Preparation for a takeoff | 0 |
| 02:00 | Takeoff | 0 |
| 04:00 | Set Altitude 30,000 ft. Heading: XXXX | 500 |
| 06:00 | Change altitude 36,000 ft Change Heading XXXX | 500 |
| 09:00 | Start reconnaissance in area Z Perform scanning flight coordinates XX to YY, report. | 500 |
| 15:00 | Series of navigation issues. | 26,000 Hypoxia episode |
| 16:00 | Detected Approaching enemy fleet, report to command post. | 26,000 Hypoxia episode |
| 16:30 | Report exchange with the central command, navigations tasks | 26,000 Hypoxia episode |
| 17:15 | Weapons preparation. | 26,000 Hypoxia episode |
| 17:35 | Engage enemy. | 26,000 Hypoxia episode |
| 18:15 | Engage enemy. | 26,000 Hypoxia episode |
| 19:45 | Engage enemy. | 26,000 Hypoxia episode |
| 20:30 | Pilot reports hypoxia recognised, takes rescue steps, immediate dive to 10,000 ft. Fix $O_2$ supply. | 0 |
| 21:15 | Oxygen supply restored | 40% Oxygen supplied |
| 22:45 | Request to report situation, report symptoms | 0 |
| 25:00 | Continue flight mission . . . | 0 |

The preloaded flight program is launched. The subject takes off and executes the various adjustments in direction and altitude as required by the flight plan. Just prior to the flight plan requiring a complex manoeuvre by the subject, the flight simulator software instructs the GO2Altitude system to gradually induce hyopoxia in order to simulate a slow depressurization of an aircraft cabin. During this period, the subject's attention is directed mainly to aircraft operation tasks and he or she is not concentrating on recognising hypoxia.

The subject encounters the insidious onset of hypoxia, and learns his individual symptoms and performance decrements during simulated flying conditions, and more importantly to note the effect on his or her flying ability. The subject notices that he tends to survey the instrument cluster less often when hypoxia is commenced, this being noted quite apart from any of the more obvious symptoms such as increased respiratory rate. This sign of hypoxia could not be noted in the absence of performing the hypoxia training in concert with a flight simulation.

Cognitive function testing is assessed continuously during each hypoxia exposure. Advantageously, the flight simulation software is used as an external cognitive function tester. Flight simulation software includes benchmark testing to measure how well a particular task is handled, response time, accuracy, and number of errors. This data can be accumulated in order to demonstrate to the subject at the end of the session that his cognitive function was impaired by a hypoxia episode. The feedback may be provided in a form of printed report or a video fragment demonstrating the screen of the flight simulator and highlighting the actions that were made (or omitted) during the simulated flight.

EXAMPLE 2

Flight Simulator Integration Code

The following code is for the implementation on the present invention within the context of Microsoft Flight Simulator.

```
using System;
using System.Collections.Generic;
using System.Linq;
using System.Text;
using System.Net;
using System.Net.Sockets;
namespace ConsoleSocketListener
{
    class Program
    {
        public enum BiofeedbackParameter
        {
            HeartBeat,
            ArterialOxygen,
            VentilatoryFrequency,
            ECG,
            BloodPressure
        }
        static bool _isAborted;
        /// <summary>
        /// Converts the passed in altitude value (given in meters) into
        /// the level of oxygen that physiologically simulates this altitude.
        /// </summary>
        static double ConvertAltitudeToOxygenPercent( double altitude_meters )
        {
            // 1.   validate the passed in altitude to be within reasonable
            //      limits (determined by the conversion table)
            // 2.   use a lookup table to convert the given value into the required
            //      oxygen level
            return -1;
        }
        /// <summary>
        /// Instructs the GO2Altitude Hypoxicator to supply the given oxygen concentration
        /// to the subject to provide physiological altitude simulation.
        /// </summary>
```

```
        static void SupplyOxygen( double oxygen_percent )
        {
            // validate the passed in value to be within [5%.40% by
Volume]
            // send the appropriate command to the hypoxicator
        }
        /// <summary>
        /// Parses the given message received from a Flight
Simulator via network.
        /// The message is simulator specific and the implementation
is not provided
        /// here.
        /// </summary>
        /// <returns>
        /// A non-negative value if the simulated altitude has been
successfully extracted.
        /// Otherwise, returns a negative value.
        /// </returns>
        static double
ExtractAltitudeMetersFromFlightSimulatorMessage( byte[ ] message )
        {
            // the implementation is FlightSim specific and not
provided here...
            return -1;
        }
        /// <summary>
        /// Initializes the GO2Altitude Hypoxicator and other
devices used to collect physiological
        /// data. This method will subscribe to the relevant device
drivers to
        /// receive physiological feedback.
        /// </summary>
        static void Initialize( )
        {
        }
        /// <summary>
        /// Called by the relevant external device whenever a
physiological parameter
        /// has been received.
        /// </summary>
        static void BiofeedbackHandler( BiofeedbackParameter
param_type, double value )
        {
            // 1.    Analyse parameter type and determine whether it is
of a critical value (e.g.
            //      can be used as safety cut-off parameter)
            // 2.    if the parameter is critical, analyse its value
and make a decision
            //      to abort (i.e. stop supplying hypoxic air to the
subject and supply
            //      oxygen air)
            // For example, the condition below will check if the
current arterial oxygen (SpO2)
            // value is below 50% and, if so, will abort the main
loop of the program / training session
            if ( param_type == BiofeedbackParameter.ArterialOxygen
&& value < 50 )
            {
                _isAborted = true;
            }
        }
        static void Main( string[ ] args )
        {
            // create network packet listener to receive data from a
Flight Simulator
            // the below code is exemplary for, for example,
FlightGear ®
            UdpClient udp = new UdpClient( 5888 );
            IPEndPoint ep = null;
            Console.Out.WriteLine( "Started UDP Listener on
0.0.0.0:5888" );
            // initializes the devices and subscribe to receive
biofeedback
            Initialize( );
            // enter listening loop - this loop is aborted when a
critical
            // condition has been met. E.g. ...OB to add
            while( !_isAborted )
            {
                // receive data from the simulator
                byte[ ] recv = udp.Receive( ref ep );
                // extract the current simulated altitude from the
message
                double sim_altitude_m =
ExtractAltitudeMetersFromFlightSimulatorMessage( recv );
                // check that the message contains altitude
information in it
                if ( sim_altitude_m >= 0 )
                {
                    // yes, we have simulated altitude => do
physiological simulation:
                    // 1.    calculate oxygen value from the
received altitude
                    double oxygen_percent =
ConvertAltitudeToOxygenPercent( sim_altitude_m );
                    // 2.    instruct the GO2Altitude Hypoxicator to
supply the calculated
                    //       air with oxygen % value
                    SupplyOxygen( oxygen_percent );
                }
            }
            // supply 40% oxygen air outside the loop to allow
subject's recovery
            SupplyOxygen( 40 );
        }
    }
}
```

EXAMPLE 3

System Including Application Programming Interface

Reference is made to FIG. 1 showing the flow of information between a flight simulator system and a hypoxicator. In particular, the exemplary system 5 comprises a processor-based flight simulator 10 having inputs 12 (including a joy stick, throttle, brakes and the like) and outputs 14 (including a visual display unit, instrument cluster and the like), a normobaric hypoxicator 20 for delivering an oxygen-depleted gas to the simulation pilot (not shown), having an oximeter 22 for measuring the oxygen saturation of the pilot's blood, and an application programming interface 30 for translating protocol instructions from the flight simulator 10 into a form which is readable by the hypoxicator 20.

EXAMPLE 4

Data Exchange Protocol

The Communication Interface (GCI) utilizes HTTP/1.1 protocol (RFC 2616—http://www.w3.org/Protocols/rfc2616/rfc2616.html) for communication with third-party applications such as flight simulator software. The hypoxicator is a GO2Altitude system.

When started, GCI creates an instance of HTTP server which, by default, will listen on port 8008.

GCI will not require authentication and will respond to any HTTP request.

Commands are delivered to hypoxicator system via GCI in a form of HTTP GET request, using the following convention:

GET/ GO2Altitude?COMMAND&PARAM$_1$=value$_1$&PARAM$_2$=value$_2$ . . . HTTP/1.1\r\n Where:

/GO2Altitude identifies GCI command processing service;

COMMAND the name of the command to be invoked param$_n$ is the n-$^{th}$ parameter name;

value$_n$ is the value of the n-$^{th}$ parameter;

All commands support optional parameter TOKEN.

The value of the TOKEN parameter can be used to match requests and responses.

The List of HTTP Responses of the Hypoxicator System:

"200 OK": the request received successfully; in some cases this response will convey the requested data (e.g. refer to the command GetClients below)

"400 Bad Request": returned if the request is malformed

"406 Not Acceptable Here": returned if the request could not be completed for some reason (e.g. request to set an unauthorised level of altitude)

"501 Not Implemented": returned by the system if the command is unknown to the GCI command processing service The command processor of the hypoxicator system always evaluates and validates requests before their execution. If validation fails (i.e. at least one command parameter is incorrect), the command contained in the request will not be executed with an error message returned.

Because of GCI data exchange protocol simplicity, all commands can be executed and tested using a Web Browser e.g. Microsoft® Internet Explorer. To test a command, enter the following URl into the address bar:

http://xxx.xxx.xxx.xxx:8008/
GO2Altitude?COMMAND¶m=value

The response returned by the hypoxicator will be displayed in the browser window.

TABLE 3

Communication Interface commands

| Command | Meaning | Comments |
|---|---|---|
| SetAltitude<br>Parameters:<br>Feet=xxx<br>Meters=yyy<br>*Token=ttt<br>**Client=id | Sets the required altitude level for simulation<br>xxx - an integer value between [0 . . . 35000] ft<br>yyy - an integer value between [0 . . . 11500] m<br>Parameters Feet and Meters are mutually exclusive | Empty "200 OK" response if successful |
| Physiological Altitude<br>Parameters:<br>Feet=xxx<br>Meters=yyy<br>*Token=ttt<br>**Client=id | Request to report actual physiologically simulated altitude expressed in feet or meters of elevation<br>xxx - an integer value between [0 . . . 35000] ft<br>yyy - an integer value between [0 . . . 11500] m<br>Parameters Feet and Meters are mutually exclusive | Refer to "Annex A" for response format |
| Oxygen<br>Parameters:<br>*Token=ttt<br>**Client=id | Supply oxygen for recovery | Empty "200 OK" response if successful |
| Get Clients<br>Parameters:<br>*Token=ttt | Request return ID of Clients (GO2Altitude client station software instances) and trainees personal details | Refer to "Annex B" for response format |
| Start Video<br>Parameters:<br>*Token=ttt<br>**Client=id | Request to GO2Altitude to START video recording | Empty "200 OK" response if successful |

TABLE 3-continued

Communication Interface commands

| Command | Meaning | Comments |
|---|---|---|
| StopVideo<br>Parameters:<br>*Token=ttt<br>**Client=id | Request to GO2Altitude to STOP video recording | Empty "200 OK" response if successful |

*TOKEN value passed to the request will be returned with the response
**ID identifies hypoxicator client station software instances. ID is essential for a multistation (multi-trainee) GO2Altitude systems; ID parameter can be omitted in a single training station hardware configuration;

Annex A

PhysiologicalAltitude command, if successful, returns a "200 OK" response. The response body carries the altitude as XML using the following format:

```
<?xml version="1.0">
<!-- the element name is the same as the command name -->
<PhysiologicalAltitude Client="id" Token="ttt" Feet="xxx"
Meters="yyy" />
```

Annex B

The GetClients command, if successful, returns a "200 OK" response. The response body carries the client details as XML using the following format:

```
<?xml version="1.0">
<GetClients> <!-- the element name is the same as the command
name -
-->
<!-- client information as available -->
<Client Id="xxx" Name="John Doe" DoB="yyyy-MM-dd" />
<Client Id="xxx" Name="John Doe" DoB="yyyy-MM-dd" />
...
</GetClients
```

The invention claimed is:

1. A system for training a subject under conditions of hypoxia, the system including:
   (i) a flight simulation system comprising a computer readable medium storing a flight plan for an aircraft requiring adjustments in direction and altitude by the subject, and comprising inputs operable by the subject to execute the adjustments in direction and altitude;
   (ii) a hypoxia induction system, wherein the flight simulation system is operably linked to the hypoxia induction system;
   (iii) means for physiological and/or cognitive assessment of the subject; and
   (iv) means for reporting the physiological and/or cognitive assessment of the subject,
   wherein the hypoxia induction system is selectively controllable at a predetermined point in the flight plan of the flight simulation, the predetermined point being one requiring the subject's attention in respect of a task associated with operating the aircraft, the task selected from one or more of the group consisting of: radio communication, navigation, heading adjustment, altitude adjustment, surveying instruments, surveying landmarks, monitoring the position of other aircraft.

2. A system according to claim 1 wherein human input is not permitted or required in an operable linkage between the flight simulation system and the hypoxia induction system.

3. A system according to claim 1 wherein one or both of the flight simulation system and the hypoxia induction system are operated according to a predetermined program.

4. A system according to claim 1 comprising means to automatically cease hypoxic conditions upon attainment of a predetermined physiological condition of the subject.

5. A system according to claim 1 comprising means for exerting an acceleration force on the subject.

6. A method for training a subject under conditions of hypoxia, the method including:
   (i) providing a system for training the subject under conditions of hypoxia, the system including:
      (a) a flight simulation system comprising a computer readable medium storing a flight plan for an aircraft requiring adjustments in direction and altitude by the subject, and comprising inputs operable by the subject to execute the adjustments in direction and altitude;
      (b) a hypoxia induction system, wherein the flight simulation system is operably linked to the hypoxia induction system;
      (c) means for physiological and/or cognitive assessment of the subject; and
      (d) means for reporting the physiological and/or cognitive assessment of the subject,
   wherein the hypoxia induction system is selectively controllable at a predetermined point in the flight plan of the flight simulation, the predetermined point being one requiring the subject's attention in respect of a task associated with operating the aircraft, the task selected from one or more of the group consisting of: radio communication, navigation, heading adjustment, altitude adjustment, surveying instruments, surveying landmarks, monitoring the position of other aircraft, and
   (ii) executing the flight plan on the flight simulation system.

* * * * *